United States Patent Office 3,350,458
Patented Oct. 31, 1967

3,350,458
PROCESS FOR PREPARING HYDRINDANTIN
Thomas R. Steadman, Kensington, Md., and Louis L. Wood, Washington, D.C., assignors to W. R. Grace & Co., New York, N.Y., a corporation of Connecticut
No Drawing. Filed Mar. 17, 1964, Ser. No. 352,678
5 Claims. (Cl. 260—590)

ABSTRACT OF THE DISCLOSURE

In abstract, this invention is directed to a process for preparing hydrindantin by reducing ninhydrin with sodium formaldehyde sulfoxylate in the presence of an aqueous acid medium.

---

The present invention relates to the production of hydrindantin, and more specifically to an improved process for reducing ninhydrin to form good yields of hydrindantin.

It is known that the treatment of ninhydrin with reducing agents such as hydrogen sulfide, ascorbic acid or o-carboxymandelic aldehyde produces hydrindantin. Such a reaction may be outlined as follows:

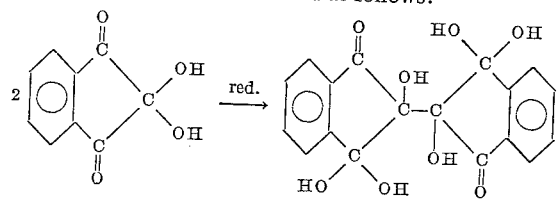

While prior art methods have produced hydrindantin, they are invariably too inefficient and/or expensive to use on a commercial scale. Use of any of the aforementioned reducing agents leads to a process which is too costly in terms of materials and/or conversion rates, or which yields a hydrindantin product that contains impurities which are removed only with difficulty.

It is therefore an object of the present invention to provide an efficient, straightforward method for reducing ninhydrin to hydrindantin.

It is another object to provide a process which produces good yields of high-purity hydrindantin using inexpensive reducing agents.

These and still further objects of the present invention will become readily apparent to one skilled in the art from the following detailed description and specific examples.

Broadly, the present invention contemplates a method for producing hydrindantin which comprises reacting ninhydrin with sodium formaldehyde sulfoxylate

in acidic aqueous solution.

More specifically, we have found that remarkably good yields of hydrindantin may be obtained from reacting aqueous solutions of ninhydrin and sodium formaldehyde sulfoxylate at a temperature of from about 0 to about 100° C., and preferably from 20–30° C. Preferably from about 0.5 to about 1.0 moles of sodium formaldehyde sulfoxylate are present in the reaction mixture per mole of ninhydrin. The aqueous reaction mixture also contains sufficient acid to render the mixture acid, i.e. pH <7. Generally, from about 0.01 to about 10.0 equivalents of acid per mole of ninhydrin present is sufficient to provide the desired reaction condition. Using these general reaction parameters yields of high purity hydrindantin in excess of about 85% based on the weight of ninhydrin used may be readily obtained.

The ninhydrin used in the practice of the present invention may be obtained from any known source. For example, it may be readily obtained by the hydrolysis of 2-chloro-2-methylmercapto-1,3-indandione.

The sodium formaldehyde sulfoxylate used in the practice of the present invention may be pre-prepared or may be made in situ, using a mixture of formaldehyde and sodium dithionite, in the reaction mixture.

As indicated above, the reaction is carried out in acidic medium. The acids used in the present invention are mineral acids such as hydrochloric, sulfuric and phosphoric; and strong organic acids such as formic and acetic acids having dissociation constants in excess of about $10^{-5}$.

The reaction mixture comprises a mixture of ninhydrin, sodium formaldehyde sulfoxylate, acid and water. The preferred ratios of these reactants are as follows: ninhydrin, 1.0 mole; sodium formaldehyde sulfoxylate, 0.5 to 1.0 moles; mineral acid, 0.01 to 10.0 equivalents; and water, from about 10 to about 50 parts by weight per combined weight of the aforementioned ingredients.

Using the above generally outlined ratios of reactants, it is found that reaction times on the order of from about 5 to about 1000 minutes, using temperatures in the range of from about 0 to about 100° C. will produce substantial yields of the desired hydrindantin. As a matter of fact, operating within the above ranges it is found that yields in excess of 80% hydrindantin based on the weight of ninhydrin used may be readily obtained.

In a preferred and typical embodiment of the present invention acidic aqueous solutions of ninhydrin are treated with aqueous solutions of sodium formaldehyde sulfoxylate at room temperature. Upon combining of the reactant solutions, hydrindantin begins to precipitate immediately. Generally, within about 1 to 2 hours at room temperature, the reaction is substantially complete and the solids which precipitate during the reaction are collected by filtration. Recrystallization of the recovered reaction product from solvents, such as acetone, readily yield high purity hydrindantin having a melting point in the range of 243–248° C. The hydrindantin obtained in the practice of the present invention finds wide utility in the manufacture of thermosensitive papers, and so forth.

Having described the basic aspects of the present invention, the following examples are given to illustrate embodiments thereof.

EXAMPLE I

A solution containing 0.001 moles of sodium formaldehyde sulfoxylate per milliliter was prepared by adding a solution of 8.7 grams of sodium dithionite and 30 milliliters of water to 20 milliliters of aqueous formaldehyde (30%). A solution containing 0.001 mole ninhydrin per milliliter was prepared by dissolving 8.9 grams of ninhydrin in 15 milliliters of water containing 2.5 milliliters of concentrated hydrochloric acid. In the runs tabulated below the reactions were carried out at 25° C. by adding the sodium formaldehyde sulfoxylate solution (A) to the ninhydrin solution (B) with good stirring. The reactions were stirred for 10 minutes, then allowed to stand for 12 hours. The resultant solids were collected by filtration and washed with water. The solids were then dried at 60–80° C. and 30 millimeters Hg pressure for 8 hours.

The results of five such runs are tabulated below:

| Run | Solution A (Ml.) | Solution A (Moles) | Solution B (Ml.) | Solution B (Moles) | Yield (G.) | Hydrindantin (Percent) |
|---|---|---|---|---|---|---|
| 1 | 1 | 0.001 | 10 | 0.01 | 0.3 | 17 |
| 2 | 3 | 0.003 | 10 | 0.01 | 0.6 | 34 |
| 3 | 5 | 0.005 | 10 | 0.01 | 1.0 | 56 |
| 4 | 7 | 0.007 | 10 | 0.01 | 1.5 | 84 |
| 5 | 9 | 0.009 | 10 | 0.01 | 1.3 | 73 |

EXAMPLE II

This example demonstrates that the reduction of ninhydrin with sodium formaldehyde sulfoxylate should be carried out in acid medium. In a manner similar to that set forth in Example I using solution A of Example I, ninhydrin was reacted with and without hydrochloric acid being present. The results are shown below:

| Run | Ninhydrin (S.) | Solution A (Ml.) | Water (Ml.) | HCl (37%) (Ml.) | Hydrindantin (G.) |
|---|---|---|---|---|---|
| 1 | 0.5 | 1.0 | 2.0 | 5.0 | 0.5 |
| 2 | 0.5 | 1.0 | 2.0 |  | 0.1 |

EXAMPLE III

To a solution of 125 grams (0.7 mole) ninhydrin and 3 liters of water containing 25 milliliters of concentrated hydrochloric acid, was added 87 grams (0.5 mole) sodium dithionite dissolved in a solution of 300 milliliters of water and 200 milliliters of aqueous formaldehyde (30%). The reaction mixture was maintained at 25° C. and a cream colored precipitate formed immediately. After stirring the resultant slurry at room temperature for 2 hours the solids were collected by filtration. A small amount of precipitate was again collected from the solution after 8 hours at 25° C. The combined solids were dried at 60–80° C. and 30 millimeters Hg pressure for 8 hours to give 113.2 of pink powder melting at 200–239° C.

This product was dissolved at 12 liters of boiling acetone and the resultant orange solution filtered to remove any traces of solid. Concentrating this solution to 2.5 liters and cooling to 0–10° C., yielded white crystals. The crystals were collected by filtration and dried for 24 hours at 30° C. and 30 millimeters Hg pressure to give 105 grams (84% yield) hydrindantin melting at 243–248° C.

The above specific examples clearly indicate that substantial yields of hydrindantin may be obtained by reducing ninhydrin in the presence of acidic sodium formaldehyde sulfoxylate at room temperature.

We claim:

1. A method for preparing hydrindantin which comprises reacting ninhydrin with sodium formaldehyde sulfoxylate in the presence of an aqueous acid medium, and recovering the hydrindantin formed thereby.

2. The method of claim 1, wherein the reaction is conducted at a temperature of from about 0 to about 100° C.

3. The method of claim 2, wherein from about 0.5 to about 1.0 mole of sodium formaldehyde sulfoxylate are present per mole of ninhydrin.

4. The method of claim 3, wherein the acid medium is aqueous hydrochloric acid or sulfuric acid.

5. The method of claim 4, wherein from about 0.01 to about 10 equivalents of acid are present per mole of ninhydrin.

References Cited

Stegemann, Hoppe-Seylers Zeitschrift Fur Physiologische Chemie 319 102–109 (1960).

Walker Formaldehyde, 3rd edition, A.C.S. Mongraph No. 159, pages 217, 218 and 219, Reinhold Pub. Co., New York, N.Y.

D. D. HORWITZ, *Primary Examiner.*